(12) United States Patent
Ycas

(10) Patent No.: US 10,232,922 B2
(45) Date of Patent: Mar. 19, 2019

(54) REVERSING GEAR DRIVE

(71) Applicant: John Ycas, Boulder, CO (US)

(72) Inventor: John Ycas, Boulder, CO (US)

(*) Notice: Subject to any disclaimer, the term of this patent is extended or adjusted under 35 U.S.C. 154(b) by 391 days.

(21) Appl. No.: 15/241,275

(22) Filed: Aug. 19, 2016

(65) Prior Publication Data
US 2017/0059016 A1   Mar. 2, 2017

Related U.S. Application Data

(60) Provisional application No. 62/209,214, filed on Aug. 24, 2015.

(51) Int. Cl.
*F16H 1/20* (2006.01)
*B63H 16/04* (2006.01)
*B63H 16/10* (2006.01)

(52) U.S. Cl.
CPC .......... *B63H 16/102* (2013.01); *B63H 16/04* (2013.01); *B63H 16/10* (2013.01); *F16H 1/203* (2013.01)

(58) Field of Classification Search
CPC ..... B63H 16/10; B63H 16/102; B63H 16/105
See application file for complete search history.

(56) References Cited

U.S. PATENT DOCUMENTS

| | | | |
|---|---|---|---|
| 522,545 A | 7/1894 | Wright |
| 537,616 A | 4/1895 | Paar |
| 603,398 A | 5/1898 | Dalmer |
| 823,075 A | 6/1906 | Petrich et al. |
| 1,353,027 A | 9/1920 | Clay |
| 1,540,695 A | 6/1925 | Howard |
| 1,624,743 A | 4/1927 | Kimberlin |
| 1,909,359 A | 5/1933 | Jaeger |
| 2,869,385 A | 1/1959 | Geyer |
| 3,677,216 A | 7/1972 | Gentemann |
| 3,729,369 A | 4/1973 | Trull |
| 3,740,780 A | 6/1973 | Knipple |
| 3,884,175 A | 5/1975 | Bellis |
| 4,052,951 A | 10/1977 | Farr |
| 4,383,830 A | 5/1983 | Cartwright |
| 4,411,214 A | 10/1983 | Horiuchi |
| 4,623,314 A | 11/1986 | Waugh |
| 4,662,849 A | 5/1987 | Loerch |
| 4,664,637 A | 5/1987 | Loerch |
| 4,738,643 A | 4/1988 | Noggle |
| 4,776,821 A | 10/1988 | duPont |
| 1,867,719 A | 9/1989 | duPont |
| 4,867,718 A | 9/1989 | duPont |
| 5,100,352 A | 3/1992 | Dunstan |
| 5,112,261 A | 5/1992 | Humphrey |
| 5,127,859 A | 7/1992 | Rantilla |

(Continued)

FOREIGN PATENT DOCUMENTS

DE   102010013609 A1 * 9/2011 ............ B63H 16/10

*Primary Examiner* — Terence Boes
(74) *Attorney, Agent, or Firm* — Marsh Fischmann & Breyfogle LLP; Russell T. Manning

(57) ABSTRACT

The present disclosure is directed to a gear system/reversing gearbox that allows reversing the direction of pivotal rotation between first and second shafts (i.e., about a pivot axis transverse to long axis of the shafts) while also translating at least some axial rotation between the shafts. In one exemplary application, the gear system is utilized in forward rowing system that allows a rowing motion substantially identical to a rearward rowing system.

21 Claims, 13 Drawing Sheets

(56) References Cited

U.S. PATENT DOCUMENTS

| | | |
|---|---|---|
| 5,213,529 A | 5/1993 | Thomas |
| 5,215,482 A * | 6/1993 | Henry .................... B63H 16/10 |
| | | 416/74 |
| 5,248,272 A | 9/1993 | duPont |
| 5,360,357 A | 11/1994 | Drake et al. |
| D356,062 S | 3/1995 | Mele |
| D356,539 S | 3/1995 | Mele |
| 5,630,739 A | 5/1997 | Mele |
| 5,647,782 A | 7/1997 | Henry |
| 5,685,750 A | 11/1997 | Rantilla |
| 6,109,988 A | 8/2000 | Dunn, Jr. |
| 6,113,447 A | 9/2000 | Roy et al. |
| 6,126,500 A | 10/2000 | Bell |
| 6,817,913 B1 | 11/2004 | Witham |
| 6,857,922 B2 | 2/2005 | Fernandez |
| 6,939,186 B1 | 9/2005 | Kuckes |
| 7,070,470 B2 | 7/2006 | Bleicken |
| 7,144,284 B1 | 12/2006 | Horan et al. |
| 7,517,267 B2 | 4/2009 | Nesseth |

\* cited by examiner

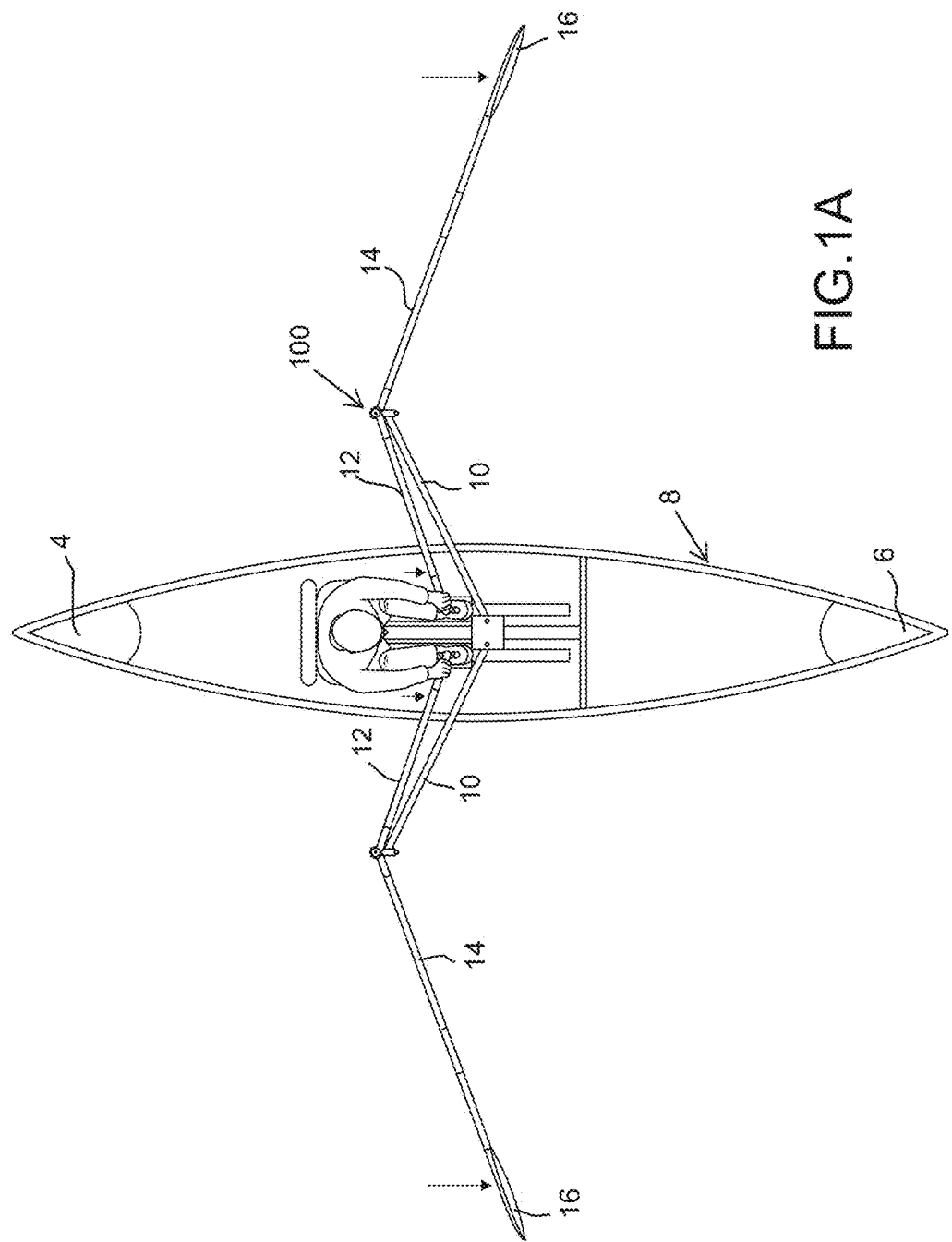

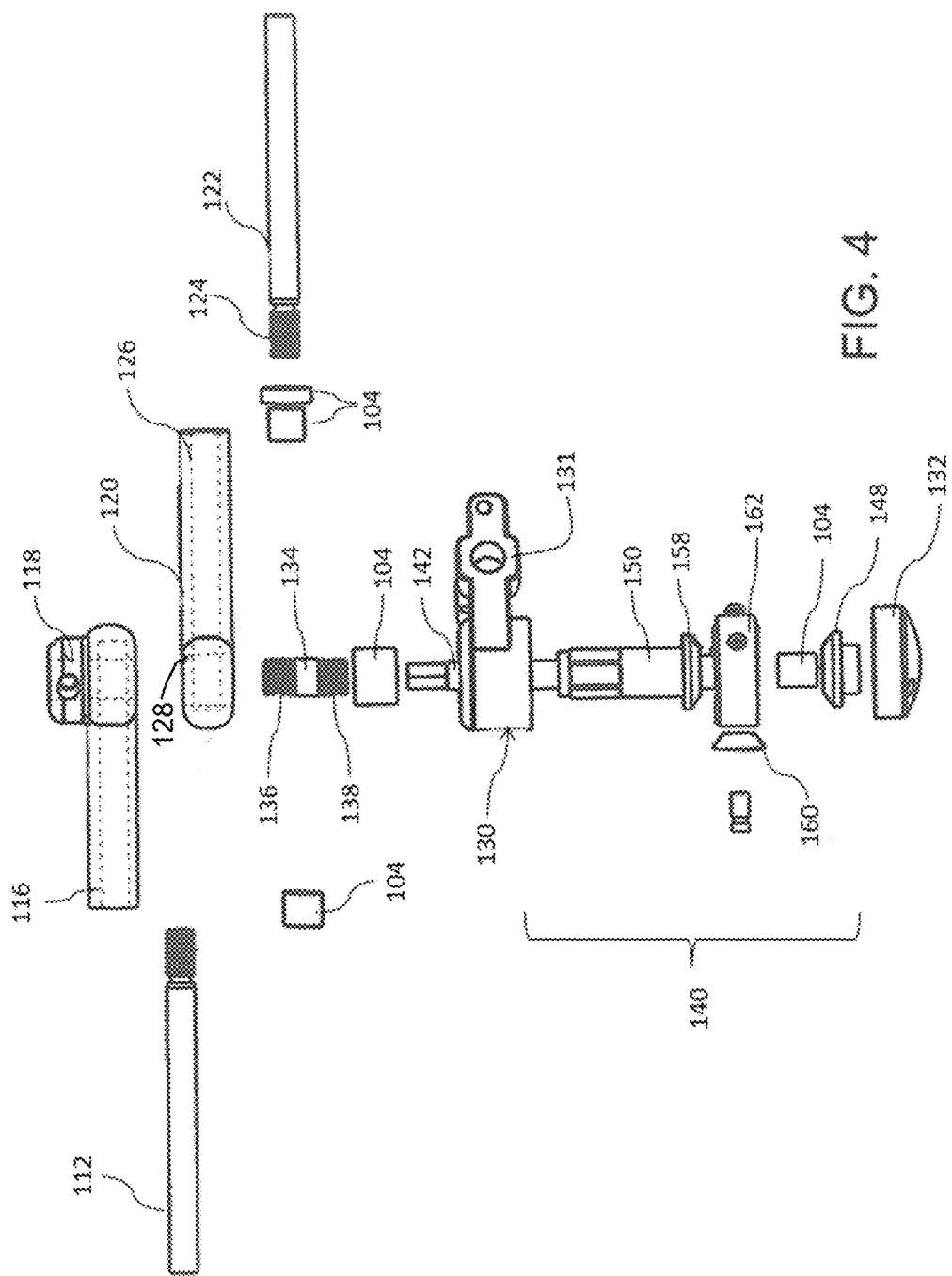

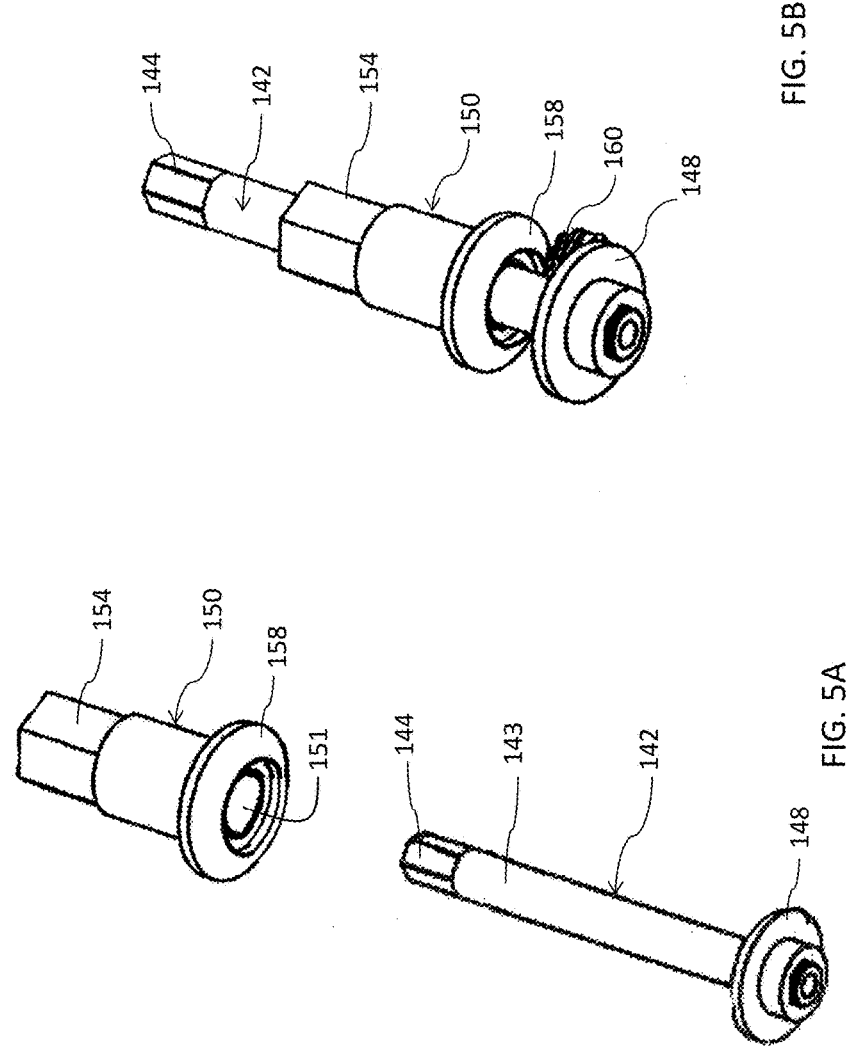

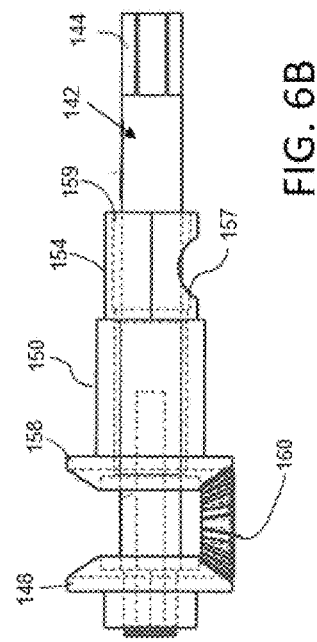
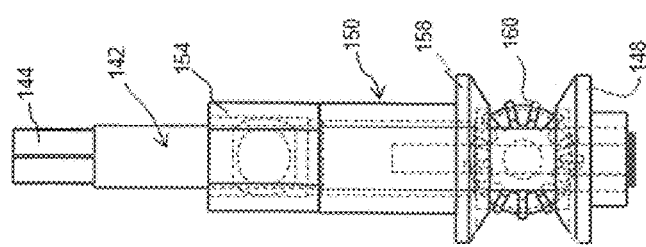
FIG. 6B
FIG. 6A

REVERSING GEAR DRIVE

CROSS REFERENCE

The present application claims the benefit of the filing date of U.S. Provisional Patent Application No. 62/209,214, having a filing date of Aug. 24, 2015, the entire contents of which are incorporated herein by reference.

FIELD

The present disclosure relates to a gear system (e.g., gearbox) that allows reversing pivotal rotation between a first lever and a second lever about a pivot axis transverse to long axes of the levers. The gear system also permits partial transmission of axial rotation (i.e., along a long axis) of one of the levers to the other lever. In one exemplary embodiment, the gear system is used in a rowing application to permit a boat to be propelled in a direction in which the rower is facing while permitting the oar blades to be feathered during a rowing stroke.

BACKGROUND

In a number of applications it is desirable to translate rotation of a first lever or shaft, about a pivot axis (e.g., planar rotation about an axis transverse to a long axis of the first shaft), to an opposite rotation of a second lever or shaft, about the same pivot axis. In some applications, it may also be desirable to transmit an axial rotation of the first shaft, about its long axis, to an axial rotation of the second shaft, about its long axis. That is, some applications could benefit from reversal of planar rotation and transmission of axial rotation between two shafts. Such applications include, for example, car steering pumps, gas valves etc.

One application where reversal of planar rotation about a pivot axis and transmission of axial rotation between two shafts would be desirable is rowing a boat. Rowing a boat traditionally has the rower facing toward the stern (back) of the boat. This leaves the rower blind to oncoming obstacles and hazards such as logs, debris, bridge abutments, other watercraft, etc. Rowing forward has the obvious benefit of allowing the rower to see and avoid problems in his path.

Rowing has been made more efficient and row boats made more stable by feathering of the oars where the oars can singularly or together be axially rotated about their long axis. While the oar is in the water and propelling the boat (e.g., pull or power stroke) the oar blade is disposed below the surface of the water and kept close to vertical to the water surface to provide maximum resistance. When the oar is raised out of the water, after the power stroke, and swung forward, air resistance is reduced if the oar blade is rotated (i.e., feathered) to be more horizontal to the water surface. In this horizontal orientation, the feathered blade also can skip along the water surface if the oar is held a little lower than desired. Likewise, the feathered blade will also cut through any waves which are in its path instead of slapping into them. Just before starting the next power stroke the oar is rotated back to being perpendicular to the surface of the water.

In order to row a boat forward in a direction a rower is facing, an oar must be split at a normal pivot point (e.g., oar lock on a gunwale) and a reversing mechanism put in place to make the outer section of the oar (e.g., oar shaft), beyond the pivot point, rotate opposite from the inner handle section (e.g., handle shaft). A number of proposed solutions exist for such a reversing mechanism. However, such proposed solutions fail to address how to permit feathering of such split oars. The present disclosure is presented in view of this background.

SUMMARY

Aspects of the presented disclosure are directed to a gearbox system/reversing gearbox that allows reversing the direction of pivotal rotation between first and second shafts (i.e., about a pivot axis transverse to long axis of the shafts) while also translating at least some axial rotation between the shafts.

According to a first aspect, reversing gearbox is provided. The gearbox includes first and second arms (e.g., an input arm and an output arm) that are connected to a common axis or pivot axis. Generally, the first and second arms are transverse to the common axis. For example, the first and second arms may rotate about the common axis in first and second parallel and offset planes. The first and second arms are connected to first and second shafts (e.g., input shaft and output shaft) of the gearbox. Rotational axes of the first and second shafts are aligned with the common axis of the gearbox. In one arrangement, the first and second shafts are at least partially coaxial. In such an arrangement, one of the shafts may be disposed partially through the interior of the other shaft (e.g., nested). The first shaft has a first portion or end fixedly connected to the first arm. The first shaft also includes a first gear attached to a second portion or end thereof. Typically, the rotational axis of the first gear is aligned with the common axis. Likewise, the second shaft has a first portion fixedly connected to the second arm and includes a second gear having a rotational axis that is aligned with the common axis. At least one idler gear is disposed between and engages the first gear and the second gear. When one of the shafts and its attached gear rotates, the idler gear translates this rotation into an opposite direction to the other shaft. That is, the idler gear allows for reversing rotational movement between shafts.

In a further arrangement, each of the arms includes a feathering shaft that extends through at least a portion of the arm (e.g., through a bore in the arm) in a direction substantially transverse to the common axis. These feathering shafts are configured to rotate relative to the arms. Each of the feathering shafts further includes a pinion gear on an end disposed within its respective arm of the gearbox. The pinion gears are adapted to engage an annular a rack gear that is coaxially aligned with the first and second shafts. Teeth on each of the pinion gears mesh with annular races of the rack gear to permit translation of axial rotation between the feathering shafts. The circular races of the rack gear engage both feathering shafts no matter what the angle there is between them. For instance, in a boating application, as an oar blade shaft and oar handle move back and forth the rack gear always fully engages the pinion gears of the feathering shafts. The two feathering shaft pinions can be of equal pitch diameters causing a 1:1 driving to driven ratio or they could be of differing pitch diameters thereby creating a different driving to driven ratio (e.g., between 1:1 and 1:3).

There are a number of features that may be incorporated into the reversing gearbox/axial translation system. Many of these features are considered novel in and of themselves as well as in various combination with other features. Stated otherwise, any of the following features may, but need not, be incorporated into the reversing gearbox and/or feathering system of the gearbox.

The gears attached to the shafts and idler gear(s) of the gearbox may define a planetary gear system. These gears may have any appropriate configuration. In one arrangement, the gears are bevel gears. The gears may be made of any appropriate high strength materials such as hardened steels, case hardened steels, hard surfaced aluminum alloys, etc. Further, sizing of the gears may be varied to alter a gear ratio of the gearbox system. For instance, the gear ratio (input to output ratio) may nominally be 1:1 but could be made from 1:1 to 3:1 by varying the relative diameters of the gears.

The gearbox may include a housing that is sealed to retain lubricants and prevent ingress of water, dirt and contaminants. Such a housing may allow use of wet or dry lubricants. The housing may be made of any appropriate material including, without limitation metals and reinforced plastics. In various arrangements, the housing may be configured to have an external mounting. In one specific arrangement, the mounting is a pivotal mounting that connects the gearbox to a rigger system of a boat. Such pivotal mounting system may limit the pivotal movement of the gearbox to, for example, limit travel (rotation) of an oar of going into and out of water.

Such a gear system is, in a non-limiting application, used in a forward rowing system. In such an application, the gear system creates the required reversal of the motion of an oar while keeping the rower's rowing motions as they would be if the rower were rowing in the traditional manner (oar dropped into the water, oar handle pulled toward the rower, oar blade raised out of the water, oar pushed away from the rower and swept to the front of the boat). This reversal allows the rower to be seated facing forward instead of toward the rear of a boat. In addition, the reversing gear system allows axial rotation of a first shaft to be at least partially translated to axial rotation of a second shaft. In the exemplary rowing application, such translation of axial rotation allows an oar to be feathered (e.g., rotated about its long axis) at any time during the stroke cycle. The amount (angle), timing and speed of feather rotation may be controlled by the rower at any time during the stroke. Stated otherwise, the feathering rotation is not mechanically controlled based on the position of the oar in the oar stroke.

The disclosed system, when utilized for a boating application, can be mounted in almost any small boat. It can be used with a fixed seat, a sliding seat (racing shell style seat), and with a sliding rigger seating system. It can be used with almost any style of rigger arms, the arms which rigidly attach the gearbox to the boat or in a traditional non-reversing system provide a rigid pivot point for the oar.

DESCRIPTION OF THE FIGURES

FIGS. 1A-1E illustrate a rowing sequence using a reversing gearbox in accordance with the present disclosure;

FIG. 4 illustrates an exploded view of one embodiment of a reversing gearbox.

FIGS. 5A and 5B illustrate one embodiment of input and output shafts of a reversing gearbox.

FIGS. 6A and 6B illustrate engagement of the input and output shafts by an idler gear.

DETAILED DESCRIPTION

Figure 1B:
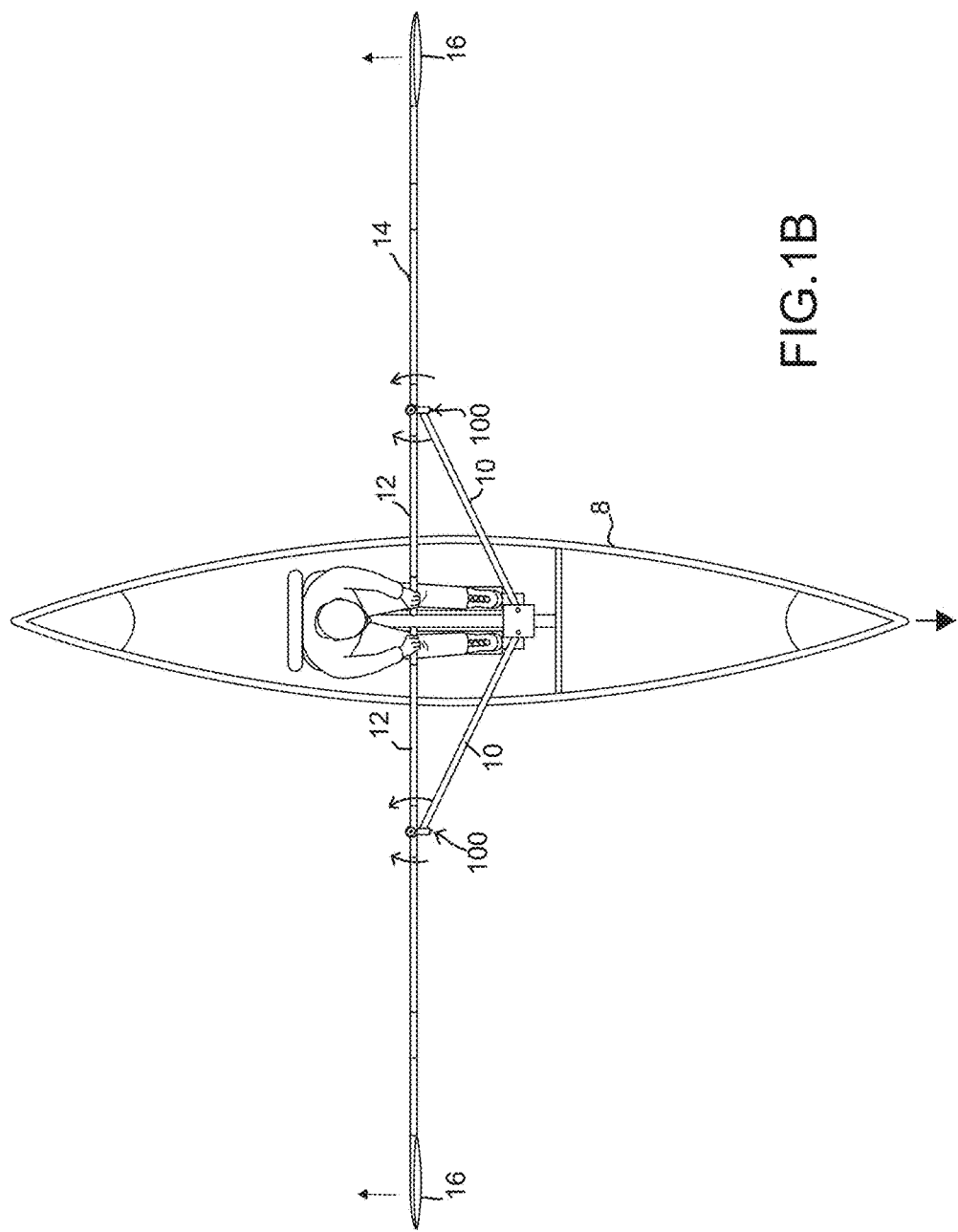

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

As variously illustrated herein, the present description is directed to an inventive gear drive system/reversing gearbox that allows reversing the direction of planar or pivotal rotation of first and second shafts about a common pivot axis, which is transverse to long axes of the shafts, while also translating at least some axial rotation between the shafts. Presented by way of example and not by way of limitation, such a reversing gearbox 100 is presented as a system that allows rowing a boat 8 while the user/rower faces the bow 6 of the boat 8 rather than facing the stern 4. See FIG. 1A. However, it is to be expressly understood that the gear drive system is not limited to such an application. In the exemplary application, the system allows a user to face in the direction the boat is moving while utilizing a rowing motion that is substantially identical to the rowing motion of a standard rowboat. To facilitate such a forward rowing motion, oars are split at their normal pivot point (e.g., outrigger oar lock, gunwale oar lock etc.) and a reversing mechanism or reversing gearbox 100 is disposed at this pivot point between a handle portion/shaft 12 and a blade portion/oar shaft 14 of each split oar. See FIGS. 1A and 2. In this regard, one end of the handle shaft 12 is attached to a first input/output arm 110 of the reversing gearbox 100 and one end of the oar shaft 14 is attached to a second input/output arm 120 of the reversing gearbox 100. These arms 110, 120 rotate about a common pivot axis A' of the gearbox 100, which is perpendicular to the surface of the paper in FIG. 2.

FIGS. 1A-1F and 2 illustrate a rowing sequence of the boat 8 utilizing the reversing gearbox 100 to permit a forward rowing motion. Of note, the configuration of the boat 8 is for exemplary purposes and is not in any way limiting. As shown, the reversing gearbox 100 is interconnected to an exemplary outrigger 10 connected to the boat 8. Typically, the reversing gearbox 100 pivotally mounts to the outrigger 10 such that the oar blade may be dipped into and lifted out of the water. That is, the entire gearbox 100 and connected shafts 12, 14 may rotate about an axis C-C' that is parallel to the surface of the paper of FIG. 2. As shown, the reversing gearbox 100 has a first arm 110 that is connected to a handle shaft 12 of the split oar. In this regard, one end of the handle shaft 12 is connected to the reversing gearbox and a second free end of the handle shaft 12 is engaged by rower. See, e.g., FIG. 2. The reversing gearbox 100 further includes a second arm 120 that is connected to the oar shaft 14 of the split oar. That is, one end of the oar shaft 14 connects to the reversing gearbox and a free end of oar shaft supports an oar blade 16. Gearing within the gearbox 100 allows the first and second arms 110 and 120 to rotate in opposite directions about the pivot axis A. That is, the first and second arms rotate in opposite directions in parallel and offset planes. See, e.g., FIG. 3.

Figure 1C:
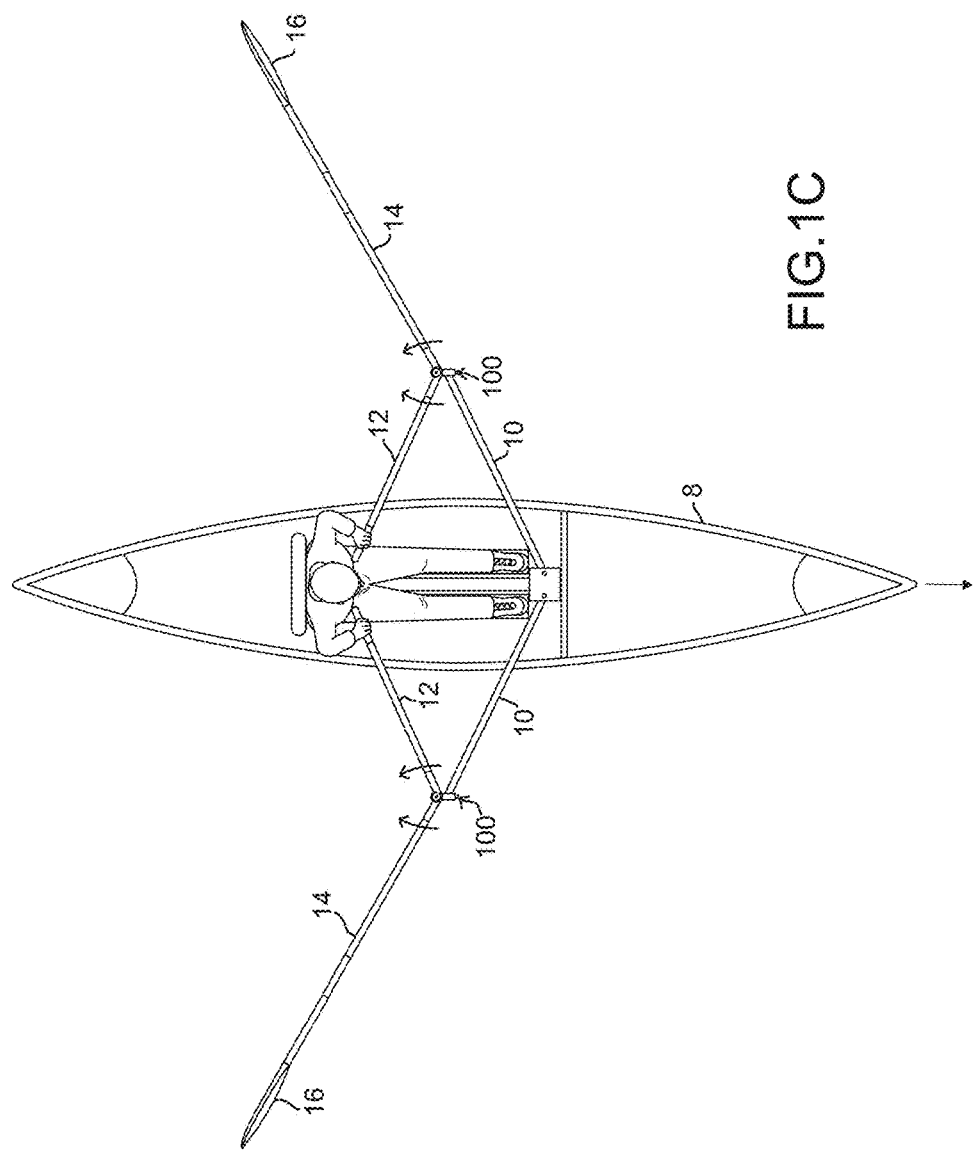
Figure 2:
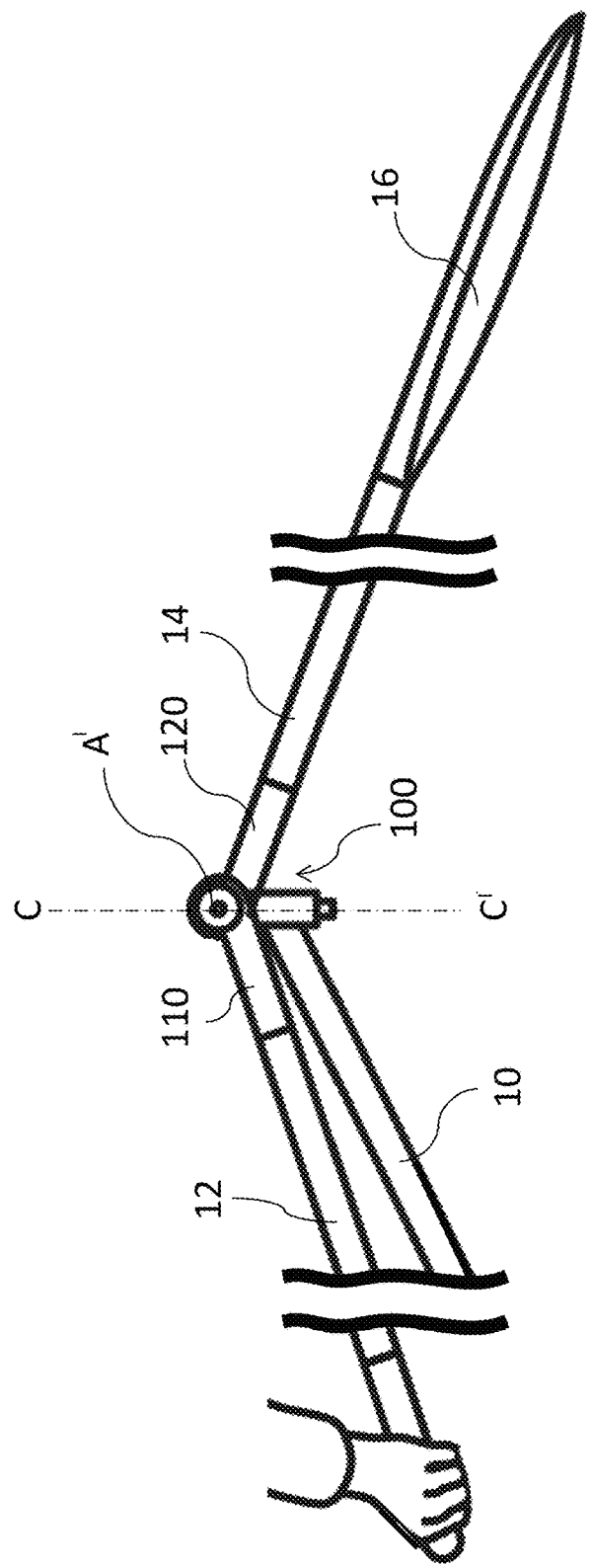
FIG. 2 illustrates a plan view of a reversing gearbox attached to an oar handle and an oar shaft.

FIG. 1A illustrates a beginning portion of an oar stroke utilizing the reversing gearbox 100 of the present disclosure. At the beginning of the oar stroke with the oar blades lifted out of the water, the rower extends the free ends of handle shafts 12 to a forward position. The reversing gearbox 100 translates the forward movement of the handle shafts 12 into a forward movement of the blade end of the oar shaft 14. That is, the handle shaft 12 and the oar shaft 14 rotate in opposite directions about the pivot axis of the gearbox 100. At this time, the user may pivot the reversing gearboxes 100 about the pivotal mounts (i.e., axis C-C') on the outriggers 10 to dip the oar blades 16 into the water. Once the oar blades 16 are disposed within the water, and preferably nearly perpendicular to the water, the user may pull back on the handle shafts 12 as shown in FIG. 1B. As the rower pulls back on the handle shafts 12, the gearboxes 100 translate the motion from the handle shafts 12 to the oar shafts 14. That is, both the handle shafts 12 and oar shafts 14 move backwards in unison albeit in different rotational directions about the pivot axis A' of the gearbox 100. This propels the boat 8 forward in the direction the rower is facing. FIG. 1C shows the end of the pull stroke. At this time, the oar shafts 14 are disposed fully back and the user may pivot the reversing gearboxes 100 about the outriggers 10 to lift the oar blades 16 out of the water.

Figure 1D:
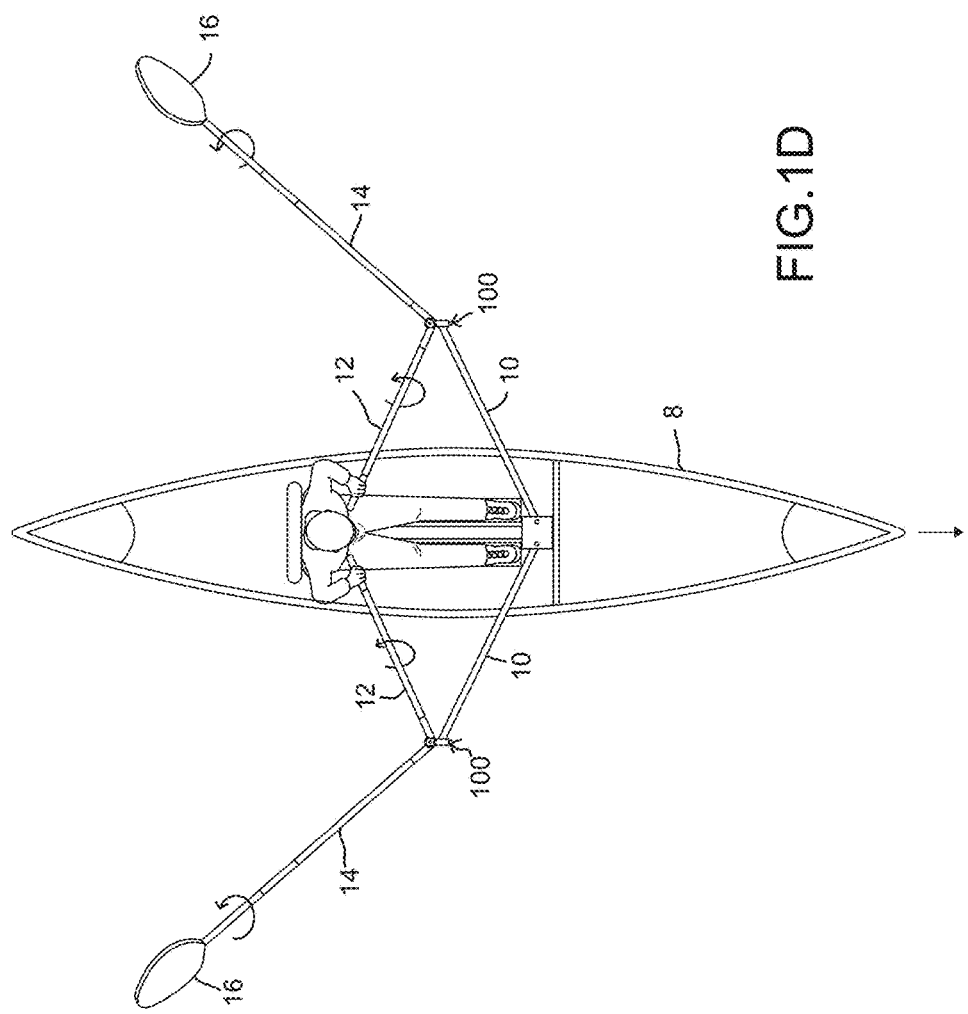
Figure 1E:
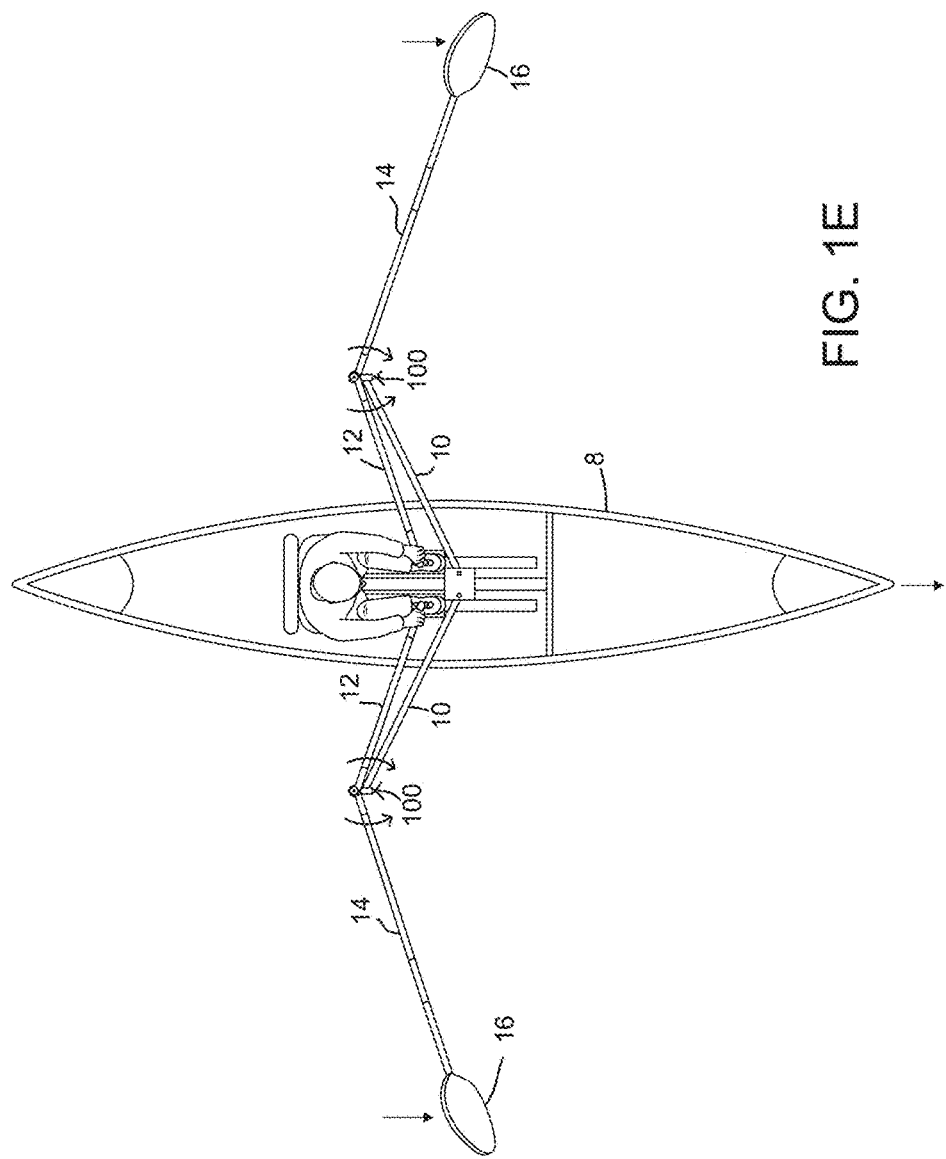

As the rower lifts the oar blades 16 out of the water as shown in FIG. 1D, the rower may rotate the handle shafts 12 about their long axes to rotate the oar shafts 16 about their long axes to feather the oar blades 16. The reversing gearbox translates this axial rotational (i.e., feathering) from the handle shaft 12 to the oar shaft 14 as is more fully discussed herein. This permits moving the oar blade from a substantially perpendicular position to the water to a substantially parallel position relative to the water as the blade sweeps forward. Such movement reduces wind resistance of the blade and allows the blade to skip over the top of the water if the blade contacts the water during the forward sweep. The rower may then sweep the oars forward by pushing the handle shafts 12 forward which results in the oar shafts 14 and oar blades 16 moving forward as shown in FIG. 1E. Likewise, before dipping the oar blade into the water at the beginning of the stroke, the rower may rotate the handle shaft 12 to reposition the oar blade 16 more perpendicular to the water. See, e.g., FIG. 1A.

Figure 3:
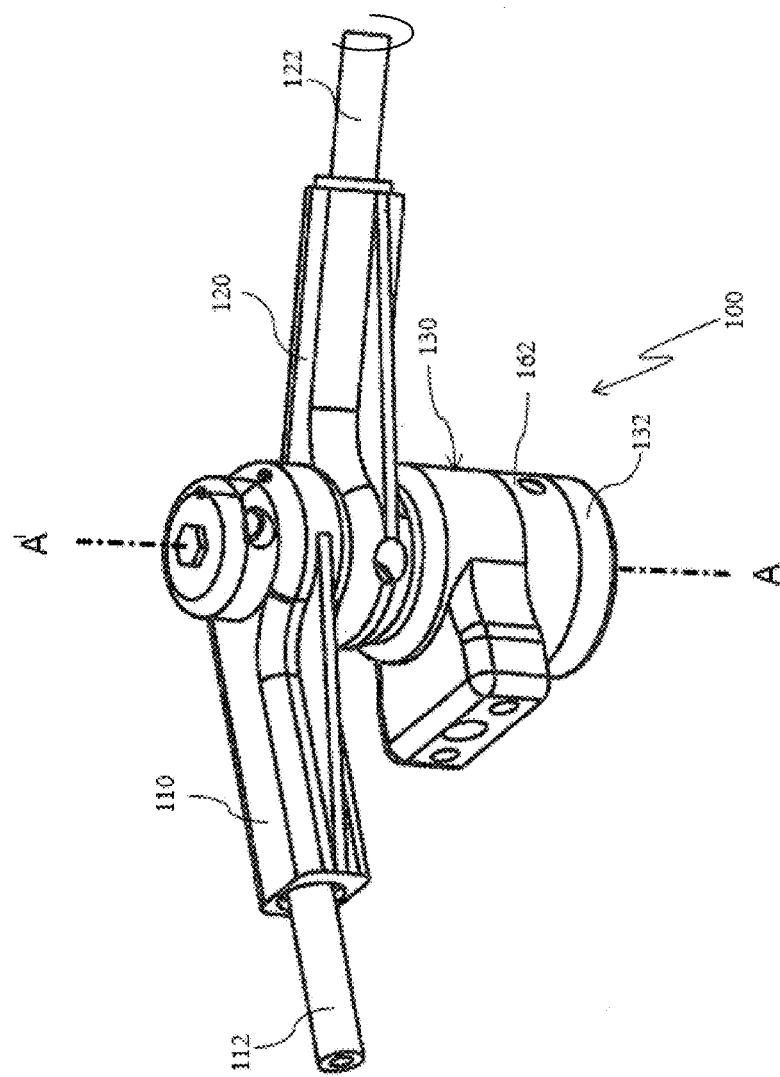
FIG. 3 illustrates a perspective view of one embodiment of a reversing gearbox.

FIG. 3 illustrates the reversing gearbox 100. As shown, the reversing gearbox 100 includes the first arm 110, the second arm 120 and a gear housing 130. The first and second arms 110, 120 are attached to the housing 130 such that they to rotate/pivot about a common central or pivot axis A-A'. That is, the arms pivot about a fulcrum/pivot axis disposed near common end of the arms. As is further discussed herein, gearing within the gear housing 130 is operative to translate planar rotational motion (i.e., about the transverse pivot axis A-A') of one of the arms into an opposite planar rotational motion of the other arm. The first arm 110 may be termed a gearbox input while the second arm 120 may be termed a gearbox output. However, such nomenclature is presented by way of convenience and not by way of limitation. It will be appreciated that either of the arms may be an input while the other arm be an output. Accordingly, no limitation should be inferred from utilization of terms such as input and output or drive and driven within the present disclosure. The first and second arms 110, 120 also each include an internal feathering shaft 112, 122, respectively. These internal feathering shafts are operative to rotate relative to interior bores of the arms 110, 120, respectively. Axial rotation of one of the feathering shafts (e.g., 112) is translated to axial rotation the other feathering shaft (e.g., 122). Such functionality is discussed herein.

FIG. 4 illustrates an exploded view of the gearbox 100. As shown, the first arm 110 includes a vertical shaft or bore 118 aligned with the central axis A-A' for engaging a first shaft or input shaft 142 of the gear system. As noted, the first arm 110 also includes an internal bore 116 (e.g., horizontal bore as shown) that receives the first feathering shaft 112 and permits the feathering shaft 112 to rotate therein. Disposed below the first arm 110 is the second arm 120, which also includes a vertical shaft or bore 128 aligned with the central axis A-A' for engaging a second shaft or output shaft 150 of the gear system. The second arm 120 also includes an internal bore 126 (e.g., horizontal bore as shown) that receives the second feathering shaft 122. Various seals or bushings 104 may be provided to align, seal and/or maintain the feathering shafts 112, 122 within the internal bores 116, 126 of the arms 110, 120. Each of the feathering shafts 112, 124 has a pinion gear 114, 124 disposed on an end of the shaft that extends into its respective bore 116, 126. These pinion gears 114, 124 extend through the arms 110, 120 into the vertical shaft bores 118, 128 of the arm to contact a rack gear 134, which translates rotational movement between the feathering shafts 112, 124.

Disposed below the second arm 120 is a top cap 130, carrier 162 and end cap 132, which collectively define the housing that provides an enclosure for components of a gear system 140 (e.g., planetary gear system). When assembled, the end cap 132 connects to a lower end of the carrier 162 and to the cap 130 to seal the gear system 140 within the housing. The gear system 140 is formed from gears attached 148, 158 to the input and output shafts 142, 150 and one or more idler gears 160 attached to the carrier 162. More specifically, the gear system 140 includes a bevel gear 148 attached to a lower end of the input shaft 142, a bevel gear 158 attached to a lower end of the output shaft 150 and one or more idler gears 160. The gear system 140 is operative to translate rotation of one of the shafts and attached arm into an opposite rotation of the other shaft and attached arm.

Various seals and bushing 104 may be used to seal and or align the shafts 142, 150, which are co-axially aligned (e.g., nested) and extend out of an upper end of the housing 130 and into the arms 110, 120. The rotational axes of the coaxial shafts 142, 150 define the pivot or central axis A-A' as illustrated in FIG. 3. In the illustrated embodiment, the housing 130 also includes a mount 131 integrally formed on its outside surface for attaching the reversing gearbox to an outrigger, etc. The configuration of the mount may be varied based on the application. However, in a rowing application, such a mount typically allows the gearbox to pivot to allow dipping an oar into the water and lifting the oar out of the water.

Figure 7:
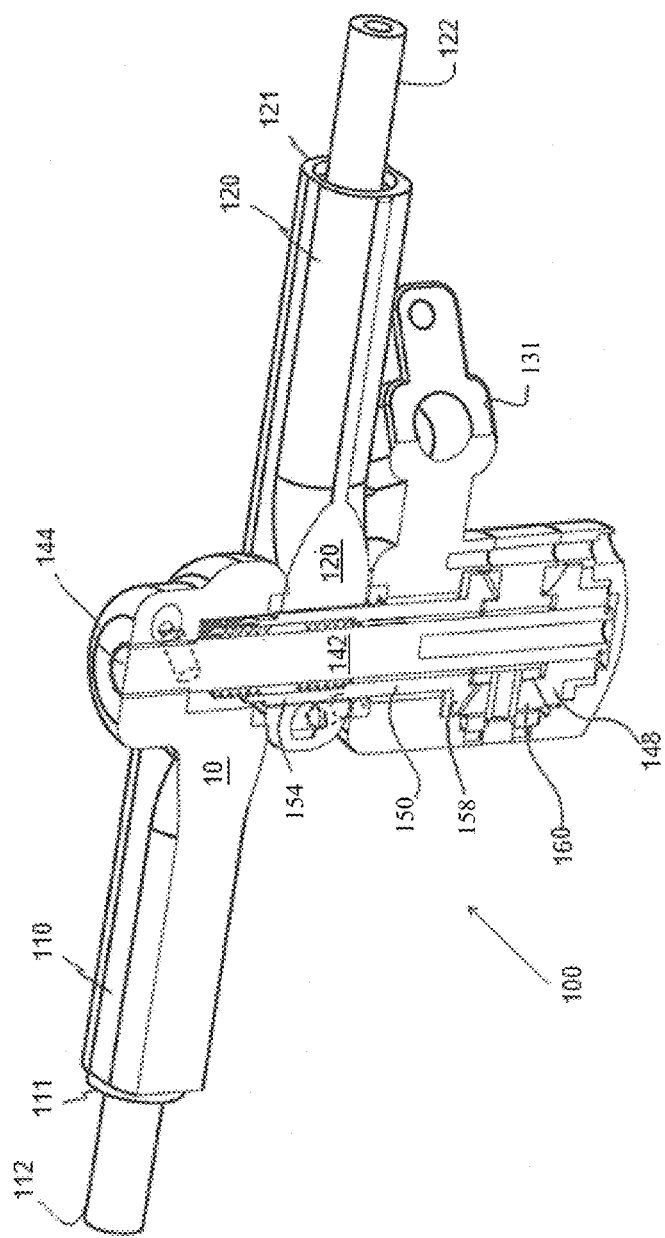
FIG. 7 illustrates a cut-away view of one embodiment of a reversing gearbox.

The input shaft 142 is best shown in FIGS. 5A, 5B, 6A and 6B includes a hexagonal connection head 144 which is received within a correspondingly shaped vertical shaft bore of the first arm or input arm 110. See for example FIG. 7. It will be appreciated other mating configurations may be utilized to connect the input shaft 142 to the input arm 110. In any case, rotation of the input arm 110 rotates the input shaft 142 and vice versa. A second end of the input shaft 142 is fixedly connected to a bevel gear 148 such that the bevel gear 148 rotates around the central axis A-A'. In the illustrated embodiment, the bevel gear 148 is connected to a hexagonal end of the input shaft 142 via mating aperture within the gear 148. It will be appreciated that other connections may be utilized. For instance, the bevel gear 148 may be integrally formed with the shaft 142. In any case, the bevel gear 148 turns in unison with the input shaft 142.

The output shaft 150 has a central bore 151 that allows the output shaft 150 to be coaxially aligned over a portion of the input shaft 142, when the gear system 140 is assembled. See FIGS. 5A-6B. That is, an elongated rod portion 153 of the input shaft 142 extends through the central bore 151 of the output shaft 150. In this regard, the output shaft 150 is configured to rotate about an outside surface of the input shaft 142. A first end of the output shaft 150 has a hexagonal connection head 154, which is received within a corresponding vertical shaft bore of the second arm or output arm 120. Accordingly, when assembled the output shaft 150 and second arm 120 rotate in unison. A second end of the output shaft 150 has a bevel gear 158 which rotates about the central axis A-A'. In the illustrated embodiment, the bevel gear 158 is integrally formed with the output shaft 150. However, this is not a requirement. In any case, the bevel gear 158 rotates with the output shaft 150 and output arm 120.

As shown in FIGS. 5B, 6A and 6B, an idler gear 160 mates between the bevel gear 148 of the input shaft 142 and the bevel gear 158 of the output shaft 150, when the gear system 140 is assembled. Of note, the teeth of the bevel gears 148, 158 are not shown for purposes of simplicity. The idler gear 160 translates the rotation of the input shaft 142 to an opposite rotation of the output shaft 150 and thereby translates rotation movement of the input arm 110 to an opposite rotational movement of the output arm 120. In the illustrated embodiment, the planetary gear system shows a single idler gear 160 disposed within the carrier 162 (see, e.g., FIG. 4), which is disposed between the housing 130 and end cap 132. While use of a single idler gear may be sufficient to translate the rotational motion between the input and output shafts, in practice multiple idler gears may be utilized to provide a more robust system. See, e.g., FIG. 8.

In the illustrated system the bevel gears 148, 158 of the input and output shafts 142, 152 are of a common size. In this regard, the rotation between the input shaft 142 and the output shaft 152 is at a 1:1 ratio. It will be appreciated that such a ratio is not necessary. That is, other ratios are possible and considered within the scope of the present invention. In such an arrangement, the size (e.g., diameter) of the bevel gears of the input and output shafts may be increased or decreased relative to one another to provide a desired gearing ratio.

The reversing gearbox 100, in addition to reversing the direction of pivotal rotation, also allows for translating axial rotation from a first pivotally connected shaft (e.g., handle shaft) to a second pivotally connected shaft (e.g., oar shaft). As noted above in relation to FIGS. 3 and 4, the feathering shafts 112, 122 extend through the horizontal bores 116, 126 of the first and second arms 110, 120 and are configured to rotate therein. Outer ends of the feathering shafts 112, 122 extend beyond the outer ends 111, 121 of each of their respective arms 110, 120. See FIG. 7. These portions of the feathering shafts may be coupled to, for example, the handle shaft 12 and oar shaft 14. Accordingly, by axially rotating the connected shafts (e.g., handle shaft and/or oar shaft), the feathering shafts 112, 122 rotate within their respective arms 110, 120.

When disposed within the horizontal bores, teeth of the pinion gears 114 and 124 on the inner ends of the feathering shafts 112, 122 engage annular races/teeth 136, 138, respectively, on a cylindrical rack gear 134. See FIGS. 4 and 7-9. As shown, the cylindrical rack gear 134 is coaxially aligned with the input shaft 142 and output shaft 150. More specifically, the rack gear 134 is a hollow cylindrical component that is coaxially disposed over a portion of the input shaft 142. In the present embodiment, the cylindrical rack gear 134 extends into an open upper end 159 of the output shaft 150. See, e.g., FIGS. 6B and 7. When the reversing gearbox is assembled, a lower portion of the rack gear 134 including the lower set of annular races 138 is coaxially disposed between the input shaft 142 and the output shaft 150. See FIG. 9. An upper portion of the rack gear 134 including the upper set of annular races 136 extends above the upper end of the output shaft 150. Though coaxially aligned with the input shaft 142 and output shaft 150, rotation of the input and output shafts does not require rotation of the rack gear 134. That is, the rack gear 134 is not driven by the input or output shafts 142, 150 but rides freely on the outside surface of the input shaft 142.

Figure 8:
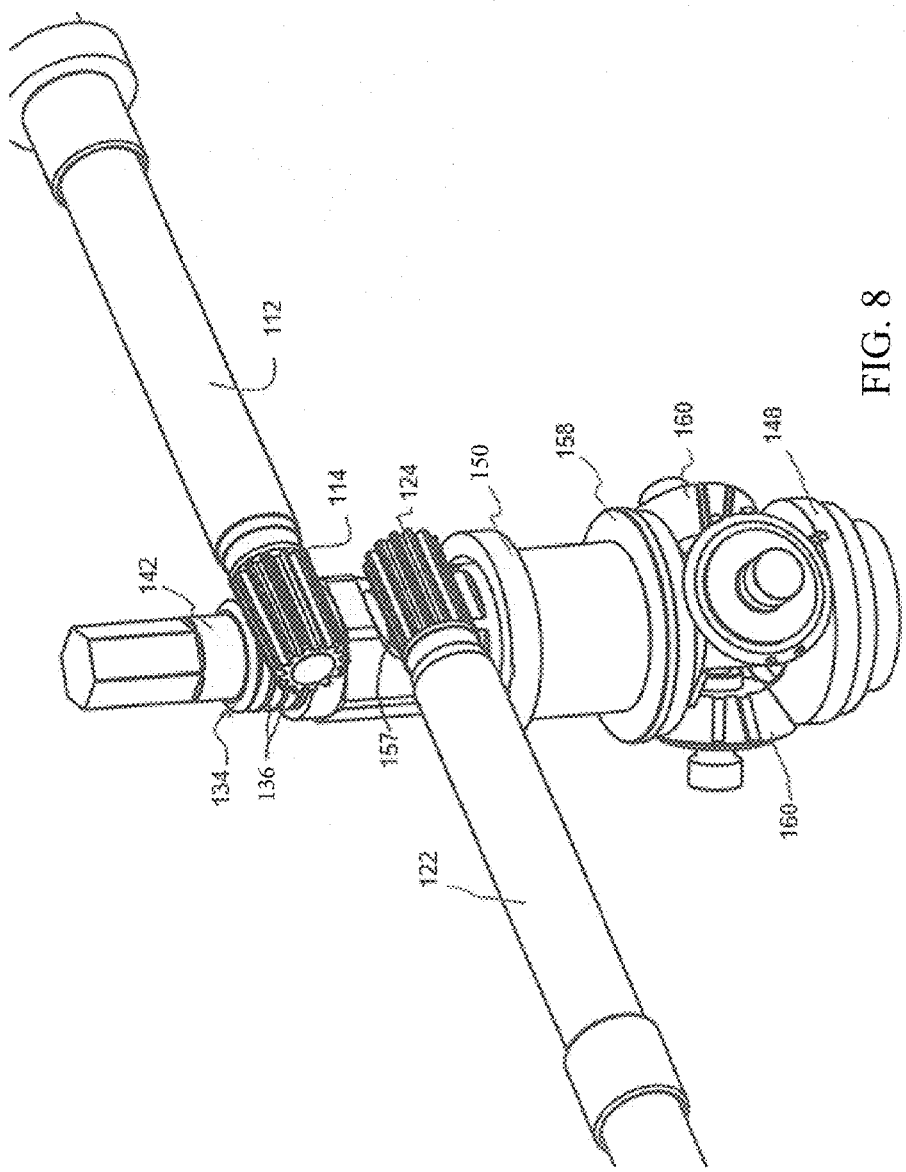
FIG. 8 illustrates connection of feathering shafts via a reversing gearbox.
Figure 9:
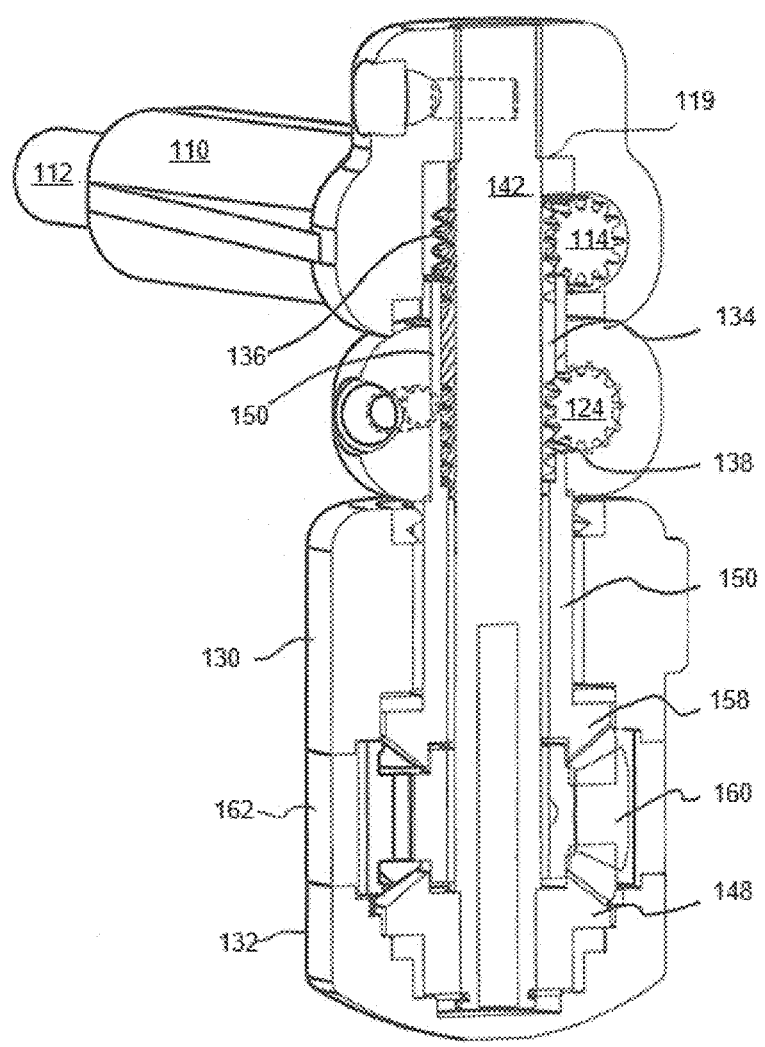
FIG. 9 illustrates a cut-away view of one embodiment of a reversing gearbox showing connection of the feathering shafts.

The annular races 136, 138 on either end of the rack gear 134 are sized to engage the teeth of the pinion gears 114, 124 on the ends of feathering shafts 112, 122. See, e.g., FIGS. 8 and 9. As the annular races extend entirely around the rack gear, the races 136, 138 can engage the pinion gears irrespective of the angular orientation of the arms and feathering shafts. As shown in FIGS. 8 and 9, the upper feathering shaft 112 extends through the horizontal bore of the upper arm 110 to directly engage the upper set of annular races 136 of the rack gear 134. The lower feathering shaft 122 also extends through the horizontal shaft bore of the lower arm to engage the lower set of annular races 138 of the rack gear. However, as the lower set of annular races 138 are disposed within the upper end 159 of the output shaft, the pinion gear must extend through a side aperture 157 in the output shaft 150 as best shown in FIGS. 6B and 8. This side aperture 157 is formed into the connection head 154 of the output shaft 150 to allow the pinion gear 124 to mate with the rack gear 134 when the rack gear is disposed within the open end of the output shaft 150.

The rack gear moves up and down along the outside surface of the input shaft 142 when the reversing gearbox is assembled. The upward movement of the rack gear 134 is limited by an internal lip 119 in vertical bore of the input arm 110. See FIG. 9. The downward moment is limited by a bottom of the open end 159 of the output shaft 150. See, e.g., FIG. 6B. The movement of the rack gear between these stops permits transmitting limited axial rotation between the feathering shafts and hence shafts connected to the feathering shafts. As will be appreciated, when the gearbox 100 is connected to an oar shaft 14 and a handle shaft 12, this permits the user to axially rotate the handle shaft 12 and thereby axially rotate an oar blade 16. Though illustrated as utilizing a one-to-one gear ratio for the feathering shafts, it will be further appreciated that the size of the pinion gears and or racking gear may be varied to provide different gearing ratios.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A reversing gearbox comprising:
   a first arm and a second arm pivotally connected to a common pivot axis of the gearbox, wherein each arm is substantially transverse to said pivot axis and configured to rotate about said pivot axis;
   a first shaft having a first end fixedly connected to said first arm and having a second end connected to a first gear, wherein a rotation axis of said first shaft and said first gear is substantially aligned with said pivot axis;
   a second shaft coaxially disposed about a portion of said first shaft and having a first end fixedly connected to said second arm and having a second end connected to a second gear, wherein a rotation axis of said second shaft and said second gear is substantially aligned with said pivot axis;
   at least one idler gear disposed between and engaging said first gear and said second gear, wherein said idler gear translates rotational motion of said first arm in first direction about said pivot axis to a rotational motion of said second arm in a second direction about said pivot axis.

2. The device of claim 1, further comprising:
   a first feathering shaft extending into a first bore of said first arm in a direction substantially transverse to said pivot axis;
   a second feathering shaft extending into a second bore of said second arm in a direction transverse to said pivot axis, wherein said first and second feathering shafts include first and second pinion gears, respectively, on the ends of said feathering shafts disposed within said bores, and wherein said feathering shafts are operative to rotate relative to said first and second bores of said first and second arms.

3. The device of claim 2, further comprising:
   an annular rack gear coaxially disposed along a portion of at least one of said first and second shafts, wherein said first and second pinion gears engage first and second portions of said annular rack gear.

4. The device of claim 3, wherein said annular rack gear translates axial rotation of one of said first and second feathering shafts to the other of said first and second feathering shafts.

5. The device of claim 3, wherein said annular rack gear is coaxially disposed over a portion of said first shaft and moves between first and second locations along a length of said first shaft.

6. The device of claim 5, wherein at least a portion of said annular rack gear is coaxially disposed within a portion of said second shaft.

7. The device of claim 3, wherein said annular rack gear comprises annular races disposed along an axial length of said annular rack gear, wherein said annular races engage said first and second pinion gears at all angular positions of said first and second feathering shafts about said pivot axis.

8. The device of claim 2, wherein said first and second pinion gears have equal diameters, wherein a gear ratio of said first and second pinion gears is 1:1.

9. The device of claim 2, wherein diameters of said first and second pinion gears are unequal, wherein a gear ratio of said first and second pinion gears is between 1:1 and 1:3.

10. The device of claim 2, further comprising:
    an oar handle shaft fixedly connected to a portion of said first feathering shaft extending out of said first arm; and
    an oar blade shaft fixedly connected to a portion of said second feathering shaft extending out of said second arm.

11. The device of claim 1, wherein said first and second gears comprise bevel gears.

12. The device of claim 1, wherein diameters of said first and second gears are equal, wherein a gear ratio of said first and second gears is 1:1.

13. The device of claim 1, wherein diameters of said first and second gears are unequal, wherein a gear ratio of said first and second gears is between 1:1 and 1:3.

14. The device of claim 1, wherein said first and second arms rotate about said pivot axis in first and second parallel and offset planes.

15. A reversing gearbox comprising:
    a first arm attached to a first rotational shaft of the gearbox and configured to rotate in a first plane transverse to a first rotational axis of said first rotational shaft;
    a second arm attached to a second rotational shaft of the gearbox and configured to rotate in a second plane transverse to a second rotational axis of said second rotational shaft, wherein said first rotational axis and said second rotational axis are aligned to define a common axis and wherein said first plane and said second plane are offset;
    first and second gears attached to said first and second shafts, respectively, wherein rotation axes of said first and second gears are substantially aligned with said common axis; and
    at least one idler gear disposed between and engaging said first gear and said second gear, wherein said idler gear translates rotational motion of said first arm in first direction about said common axis to a rotational motion of said second arm in a second direction about said common axis.

16. The device of claim 15, wherein one of said first and second shafts comprises a central bore and the other of said first and second shafts is disposed though said central bore, wherein said first and second shafts are at least partially coaxial.

17. The device of claim 15, further comprising:
    a first feathering shaft extending into a first bore of said first arm in a direction substantially transverse to said common axis;
    a second feathering shaft extending into a second bore of said second arm in a direction transverse to said common axis, wherein ends of said first and second feathering shafts disposed within said bores include first and second pinion gears, respectively, and wherein said feathering shafts are operative to rotate relative to said first and second bores of said first and second arms.

18. The device of claim 17, further comprising:
    an annular rack gear coaxially disposed along said common axis, wherein said first and second pinion gears engage first and second portions of said annular rack gear.

19. The device of claim 18, wherein said annular rack gear translates axial rotation of one of said first and second feathering shafts to the other of said first and second feathering shafts.

20. The device of claim 18, wherein said annular rack gear moves between first and second locations along a length of said common axis.

21. The device of claim 18, wherein said annular rack gear comprises annular races disposed along an axial length of said annular rack gear, wherein said annular races engage said first and second pinions gears at all angular positions of said first and second feathering shafts about said common axis.

* * * * *

UNITED STATES PATENT AND TRADEMARK OFFICE
CERTIFICATE OF CORRECTION

PATENT NO. : 10,232,922 B2
APPLICATION NO. : 15/241275
DATED : March 19, 2019
INVENTOR(S) : John Ycas Page 1 of 1

It is certified that error appears in the above-identified patent and that said Letters Patent is hereby corrected as shown below:

In the Claims

Column 9, Line 9, delete "aim" and insert therefor --arm--.

Column 9, Line 33, delete "aim" and insert therefor --arm--.

Signed and Sealed this
Seventh Day of May, 2019

Andrei Iancu
*Director of the United States Patent and Trademark Office*